F. DEMING.
Improvement in the Manufacture of Rod Solder.
No. 125,666. Patented April 16, 1872.
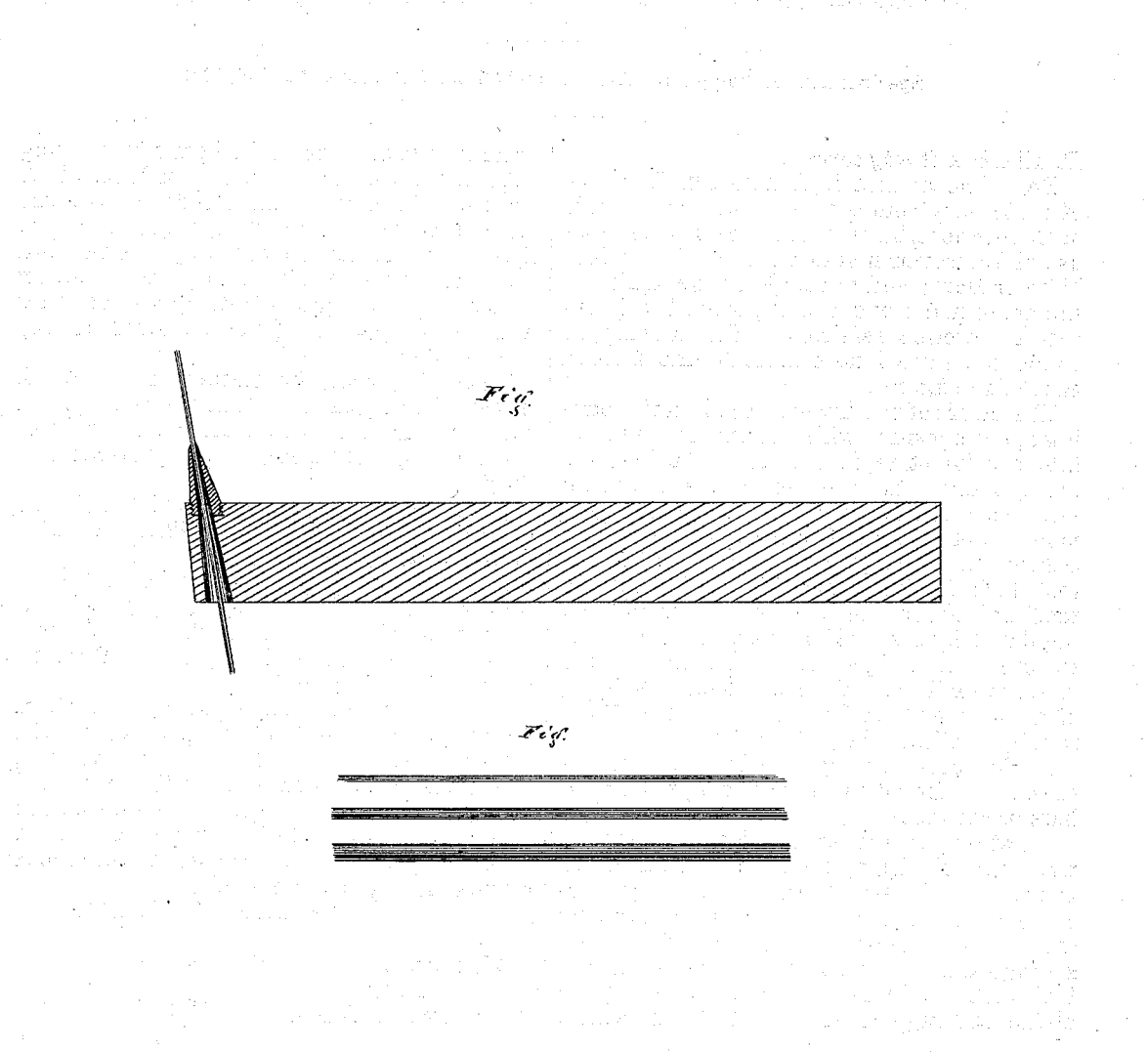
Witnesses.
T. Kirk.
Geo. B. Lamb.
Inventor.
Ferdinand Deming 125,666

UNITED STATES PATENT OFFICE.

FERDINAND DEMING, OF WATERBURY, CONNECTICUT.

IMPROVEMENT IN THE MANUFACTURE OF ROD-SOLDER.

Specification forming part of Letters Patent No. 125,666, dated April 16, 1872.

*To all whom it may concern:*

Be it known that I, FERDINAND DEMING, of Waterbury, county of New Haven and State of Connecticut, have invented certain new and useful Improvements in Forming Solder into Wire or Bars; and to enable others skilled in the art to make and use the same I will proceed to describe, referring to the drawing, in which the same letters indicate like parts in each of the figures.

The nature of this invention consists in forming the composition which composes the solder into a solid state, in a round or cylindrical block of any suitable dimensions, and securing said block in a screw-cutting lathe in the common way of holding articles to be turned, and securing a properly-formed cutter-tool in the tool-stock in the common way, and cutting rods, or bars, or wire of solder of uniform size, regulated by the size or cut of the tool as it revolves. The object of this invention is to produce solder in a more merchantable shape, of various and uniform sizes, cheapen, and rapidly facilitate the manufacture.

In the accompanying drawing is shown one of the tools for cutting and forming solder into bars or wire rods.

I first prepare the composition for solder and form it in blocks, round form, of suitable dimensions, and secure said block in a screw-cutting lathe in the common way of securing articles for being turned or planed. I then arrange and secure one or more cutters in the tool-stock of a lathe or planer, or their equivalents, and regulate the feed of the machines according to the size of the bars or wire being cut from the block. The tool or tools which are used for cutting these rods or wire are made hollow at their cutting-edges or bits, so that the solder, as it is cut, will pass through the cutter portion of the tool. This hollow cutter may be made round, square, or other desirable shape, and of various sizes, as may be desirable.

In cutting over the surface of this block ridges will be formed, so that when the tool is set for the next cut it should be set so as to cut the ridge formed from the previous cutting.

Thus I am enabled to form solder into bars or wire rods in a cheaper, more merchantable, and uniform shape.

I believe I have thus shown the nature of this invention so as to enable others skilled in the art to make and use the same therefrom.

What I claim, therefore, and desire to secure by Letters Patent, is—

The method of manufacturing solder-bars herein described—that is to say, casting the solder into a block of suitable form, chucking or securing said block in a turning-lathe, and turning it down by a hollow cutting-tool moved laterally along the block in the usual manner of turning, and thus produce a continuous round shaving or rod of solder.

FERDINAND DEMING.

Witnesses:
T. KIRK,
GEO. B. LAMB.